UNITED STATES PATENT OFFICE.

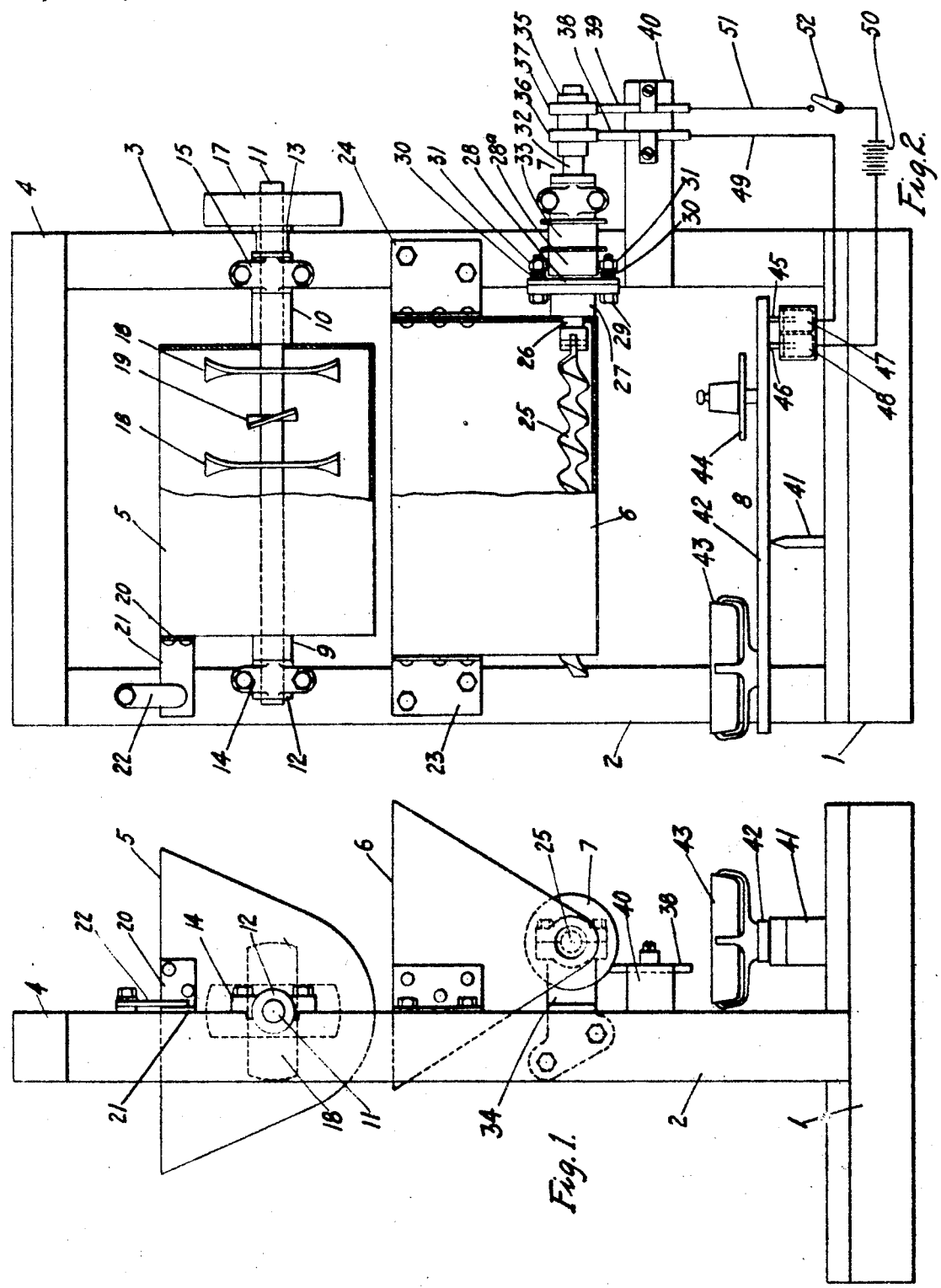

HENRY R. EDGECOMB, OF WILKINSBURG, PENNSYLVANIA, ASSIGNOR TO WESTINGHOUSE ELECTRIC AND MANUFACTURING COMPANY, A CORPORATION OF PENNSYLVANIA.

MIXING AND MEASURING MACHINE.

1,241,501.  Specification of Letters Patent.  Patented Oct. 2, 1917.

Application filed December 4, 1914. Serial No. 875,443.

*To all whom it may concern:*

Be it known that I, HENRY R. EDGECOMB, a citizen of the United States, and a resident of Wilkinsburg, in the county of Allegheny and State of Pennsylvania, have invented a new and useful Improvement in Mixing and Measuring Machines, of which the following is a specification.

My invention relates to mixing and measuring machines adapted to weigh out successive definite portions of mixed pulverulent or pasty material, and it has for its object to provide a machine of this character which shall be simple in construction and efficient in operation, and which shall be provided with electrically operated devices for automatically controlling the feeding operation of the machine.

The structural details of my invention are illustrated in the accompanying drawing, in which Figure 1 is a side elevational view of a mixing and measuring machine embodying the principles of my invention, and Fig. 2 is a front elevational view of the apparatus shown in Fig. 1, the electric control circuit being also diagrammatically illustrated.

The machine shown in the drawings comprises a base 1 upon which is mounted a supporting frame consisting of uprights 2 and 3 which are joined by a beam 4. The uprights 2 and 3 support a mixing hopper 5, a feeding hopper 6 and an electromagnetic clutch device 7, while the base 1 supports a weighing scale 8 adapted to receive material fed from the feeding hopper 6.

The mixing hopper 5 is provided with oppositely-disposed sleeves 9 and 10 which serve to support the hopper 5 upon a shaft 11. The ends of the shaft 11 are supported in bearings 12 and 13 in brackets 14 and 15 that are secured, respectively, to the uprights 2 and 3. One end of the shaft 11 is provided with a driving pulley 17, and to the part of the shaft within the hopper 5 are secured a number of mixing blades 18 and 19, which may be of any desired form, according to the nature of the material that is to be mixed. Secured to one side of the hopper 5, near its upper edge, is an L-shaped member 20 having an outwardly extending arm 21 which rests adjacent to the upright 2 when the hopper 5 is in the position shown in the drawing. A pivoted member 22 is adapted to be passed over the arm 21 in order to maintain the hopper 5 in the position shown. By moving aside the pivoted member 22, the hopper may be released and swung downward, in order to deposit mixed material in the feeding hopper 6.

The feeding hopper 6 is provided with outwardly-extending brackets 23 and 24, which are secured, respectively, to the uprights 2 and 3. Disposed near the bottom of the hopper 6 is a feed screw 25 which is attached to the inner end of a short shaft 26, to which is secured, outside of the hopper 6, a flanged collar 27. A plate 28 is movably secured to the flanged collar 27 by means of bolts 29, helical springs 30 being interposed between the plate 28 and nuts 31 that surround the bolts 29. The plate 28 is thus held yieldingly against the flanged collar 27 and forms the movable driven member of the electromagnetic clutch 7 which controls the operation of the feed screw 25. The driving portion 28$^a$ of the clutch 7, which may be of any well known construction, is secured to a short shaft 32 and comprises a pulley 33 by means of which power may be applied from any convenient source to produce continuous rotation. A bracket 34 provides a bearing for a shaft 32 and is secured to the upright 3. The shaft 32 carries a sleeve 35 of insulating material provided with slip rings 36 and 37, which are connected to the winding of the electromagnetic clutch and are engaged by brushes 38 and 39, respectively, the brushes being supported upon a bracket 40, secured to the upright 3.

The scale 8 may be of any desired construction. For the purpose of illustration, it is shown as comprising a knife-edge support 41 secured to the base 1 and supporting a scale beam 42 provided with a scale pan 43 at one end and with a weight support 44 near the other end. The scale pan 43 is disposed immediately below the outer end of the feed screw 25. Secured beneath the scale beam 42, on the side of the knife edge 41 opposite to the scale pan 43, is a pair of electric contacts 45 and 46 that are adapted to enter respective cups 47 and 48 which may contain mercury or other liquid conducting material. The mercury in the cup 47 is electrically connected, by means of a conductor 49, to the brush 38, and the mercury in the cup 48 is connected to one terminal of a primary battery 50, the opposite terminal of which is connected to the brush 39 by means of a conductor 51 in which is interposed a switch 52.

In the operation of my device, the material to be mixed and weighed is first deposited in the hopper 5 and power is applied through the pulley 17 to rotate the shaft 11 and thereby to cause the blades 18 and 19 to thoroughly mix the material in the hopper. When this is accomplished, or when it is desired to replenish the said hopper 6, the member 22 is pushed aside, and the hopper 5 is rotated and its contents emptied into the hopper 6. When it is desired to begin weighing out successive portions of the mixed material, power is applied to the pulley 33, and the switch 52 is closed, the scale 8 being in the position shown in Fig. 2, in which the contact members 45 and 46 are immersed in the mercury in the cups 47 and 48. The electric circuit is completed from the battery 50 through the conductor 51, brush 39, slip ring 37, the winding of the electromagnetic clutch 7, slip ring 36, conductor 49, and contact members 45 and 46, and causes the plate 28 to be attracted magnetically against the pressure of the springs 30. The parts of the clutch 7 being thus held in contact, the screw 25 is caused to rotate in the proper direction to feed the material to be weighed into the scale pan 43. When the selected weight of material has been fed into the pan 43, the scale beam 42 will be rotated upon the knife edge 41, and the contact members 45 and 46 thereby removed from the mercury contact members 47 and 48. The electric circuit being broken, the parts of the magnetic clutch will be separated by means of the springs 30, and the rotation of the screw 25 will instantly stop. The operator may then add to, or take from, the load in the scale pan 43 a small quantity of material in order to obtain an exact balance, the switch 52 being opened during such adjustment of the load. The scale pan is then emptied and replaced in position, and the switch 52 is again closed in order to start the next weighing operation. If the fine adjustment of the weight of each portion of material is not necessary, the pan 43 may be removed and emptied without opening the switch 52, the beam 42 being held down until the empty pan is replaced, when it is allowed to return to the horizontal position, which automatically starts the next weighing operation.

One particularly advantageous application of my machine is to the mixing and weighing of moist materials which are used in making molded articles. By its use, the several ingredients of the molding mixtures may be intimately mixed in relatively small batches and weighed out while freshly mixed and as rapidly as the successive portions can be handled by the molder. It is also adapted for use by the molder himself, a charge being automatically weighed out while the previous charge is being molded.

The amount that is automatically weighed out may be varied by merely changing the weight upon the pan 44, and it is not necessary to make time-consuming adjustments in the operating parts of the machine, such as are necessary in ordinary commercial weighing machines.

The embodiment of my invention shown in the drawing and described above may be readily varied without departing from the spirit and scope of my invention, and I therefore wish it to be understood that my invention is not restricted to these structural details but is limited only by the scope of the appended claims.

I claim as my invention:

1. A mixing and weighing machine comprising a feeding device including a feed screw, a weighing scale adapted to receive material from the said feeding device, an electromagnetic clutch adapted to drive the said feed screw, and a circuit adapted to be controlled by the movement of the said weighing scale for energizing the said electromagnetic clutch.

2. A mixing and weighing machine comprising a feeding device including a feed screw, a weighing scale adapted to receive material from the said feeding device, an electromagnetic clutch adapted to drive the said feed screw, and a circuit adapted to be controlled by the movement of the said weighing scale for energizing the said electromagnetic clutch, the said circuit including a primary battery, a shaft secured to the driving portion of the said clutch, slip rings disposed on the said shaft and electrically connected to the winding of the said clutch, brushes engaging the said slip rings, spaced mercury contact members, and other contact members secured to the said scale and adapted to coöperate with the said first-named contact members.

3. A mixing and weighing machine comprising a pivoted mixing hopper, a set of mixing blades disposed therein, a feeding hopper disposed below the said mixing hopper and adapted to receive material therefrom, a weighing scale disposed below the said feeding hopper and a feeding screw adapted to deliver material from the feeding hopper to the said scale.

4. A mixing and weighing machine comprising a mixing hopper, a mixing device disposed therein, a feeding hopper adapted to receive material from the said mixing hopper, a feeding screw disposed in the said feeding hopper, a weighing scale adapted to receive material from the said feeding hopper, and electrically actuated means for controlling the operation of the said feeding screw in accordance with the amount of material delivered to the said scale.

5. A mixing and weighing machine comprising a feeding device including a feed screw, a weighing scale adapted to receive material from the said feeding device, an electromagnetic clutch adapted, when electrically energized, to drive the feed screw, and a circuit for energizing the said electromagnetic clutch and including contact members associated with the said weighing scale and adapted to close the said circuit while the said scale is in position to receive material from the said feeding device and to open the said circuit when a predetermined amount of material has been deposited upon the said scale.

In testimony whereof, I have hereunto subscribed my name this 25th day of Nov., 1914.

HENRY R. EDGECOMB.

Witnesses:
   GOLDIE E. McGEE,
   B. B. HINES.